United States Patent
Cain et al.

(10) Patent No.: US 7,240,726 B2
(45) Date of Patent: Jul. 10, 2007

(54) ELEVATING OPERATOR CABIN FOR COILED TUBING INJECTOR

(75) Inventors: Troy Cain, Burleson, TX (US); David McCulloch, Arlington, TX (US)

(73) Assignee: Varco I/P, Inc., Houston, TX (US)

( * ) Notice: Subject to any disclaimer, the term of this patent is extended or adjusted under 35 U.S.C. 154(b) by 374 days.

(21) Appl. No.: 10/839,380

(22) Filed: May 5, 2004

(65) Prior Publication Data

US 2005/0093340 A1 May 5, 2005

Related U.S. Application Data

(60) Provisional application No. 60/468,240, filed on May 5, 2003.

(51) Int. Cl.
*E21B 19/22* (2006.01)
(52) U.S. Cl. .............. 166/77.2; 296/190.04; 180/89.13
(58) Field of Classification Search ........... 414/629, 414/631; 296/190.04, 26.04; 180/89.13; 166/77.2
See application file for complete search history.

(56) References Cited

U.S. PATENT DOCUMENTS

| | | | | |
|---|---|---|---|---|
| 2,420,903 A | * | 5/1947 | Noble | 182/144 |
| 2,538,517 A | * | 1/1951 | Hayden | 414/233 |
| 3,907,066 A | * | 9/1975 | Newton | 182/112 |
| 5,090,039 A | * | 2/1992 | Gard et al. | 378/59 |
| 5,271,461 A | * | 12/1993 | Decker et al. | 166/185 |
| 6,003,598 A | | 12/1999 | Andreychuk | |

FOREIGN PATENT DOCUMENTS

| | | |
|---|---|---|
| DE | 4444352 A1 | 6/1995 |
| EP | 0184636 A1 | 6/1986 |
| RU | 2067153 C1 | 9/1996 |
| RU | 2078902 C1 | 5/1997 |

\* cited by examiner

*Primary Examiner*—David Bagnell
*Assistant Examiner*—David Andrews
(74) *Attorney, Agent, or Firm*—Marc A. Hubbard; Gardere Wynne Sewell LLP

(57) ABSTRACT

A transportable, elevating operator cabin for use in connection with controlling coiled tubing injection equipment comprises a cabin including control elements; an elongated flexible element of fixed length, such as a belt or chain, extending under the cabin, between two, elevated points on adjacent structures located on opposite sides of the cabin; and a take-up mechanism for shortening the length of the flexible element between the two, elevated points. The take-up mechanism is mounted in a fixed position relative to the cabin so that operation of the take-up mechanism results in elevating of the cabin with respect to the adjacent structures. The cabin may be raised to a distance roughly equal to the height of the cabin while maintaining a compact design not much larger than the cabin itself that is suitable for transport, and the arrangement avoids mechanical complexity and costs associated with using other types of lifting mechanisms.

24 Claims, 10 Drawing Sheets

ELEVATING OPERATOR CABIN FOR COILED TUBING INJECTOR

This application claims the benefit of U.S. Provisional Application No. 60/468,240, filed May 5, 2003.

FIELD OF THE INVENTION

The invention relates generally to operator control cabins for use in operating oilfield-related equipment.

BACKGROUND OF THE INVENTION

Continuous pipe, generally known within the industry as coiled tubing since it is stored on a large reel, has been used for many years. It is much faster to run into and out of a well bore than conventional jointed straight pipe since there is no need to join or disconnect short segments of straight pipe.

Coiled tubing "injectors" are machines that are used to run continuous strings of pipe into and out of well bores. Examples of coiled tubing injectors include those shown and described in U.S. Pat. Nos. 5,309,900, 6,059,029 and 6,216,780. A crane, mast or rig is typically used to hold the injector and a blowout preventer on top of the wellhead while the injector is operated to run coiled tubing in and out of the well. A reel, on which the tubing is stored, and the injector are operated in conjunction so that tubing is unwound from the reel as the injector is inserting it into the well bore, and wound back on the reel as the injector is removed from the well bore.

Generally, it is undesirable to have electric devices at a well site because of the risk of igniting an explosion. Therefore, only hydraulic power is used to operate the reel and the injector. A "power pack" supplies pressurized hydraulic fluid to hydraulic motors on the reel and the injector. The power pack includes a diesel-powered engine turning a hydraulic pump. A operator controls the operation of the reel and injector by controlling the flow of hydraulic fluid to the motors using a set of valves. The hydraulic system controls are placed in a small cabin, in which an operator sits.

The reel and the injector must be operated synchronously to avoid placing excessive stress on the tubing and other problems. The coiled tubing must also be properly wound back on the reel. Therefore, the operator prefers to be in a position that allows him to view simultaneously the injector and the reel. This position is usually directly behind the reel, in line with the tubing and injector. Therefore, the operator's control cabin is placed behind the reel, generally in line with the reel and injector.

Because of the relatively large size of the reels, the cabin must be elevated to enable the operator to see over the reel. However, to transport the cabin to the well site it also must be small and compact. Cabins therefore typically include some sort of lifting mechanism that allows the cabin to be raised to an elevated position when set up at the well site.

SUMMARY OF THE INVENTION

With larger diameter tubing being used, reels of coiled tubing have become quite large. Conventional lifting mechanisms do not lift control cabins high enough to see over the top of the reel. The invention is generally directed to an improved lifting mechanism, particularly one that enables a transportable control cabin to be lifted higher to improve visibility of the operator in the cabin. For example, it may be used to raise the cabin to a distance roughly equal to the height of the cabin while maintaining a compact design not much larger than the cabin itself that is suitable for transport. Furthermore, it avoids the mechanical complexity and cost of other types of lifting mechanisms. A preferred embodiment of the invention is described in detail below in reference to an exemplary application of it.

DETAILED DESCRIPTION

Figure 1:
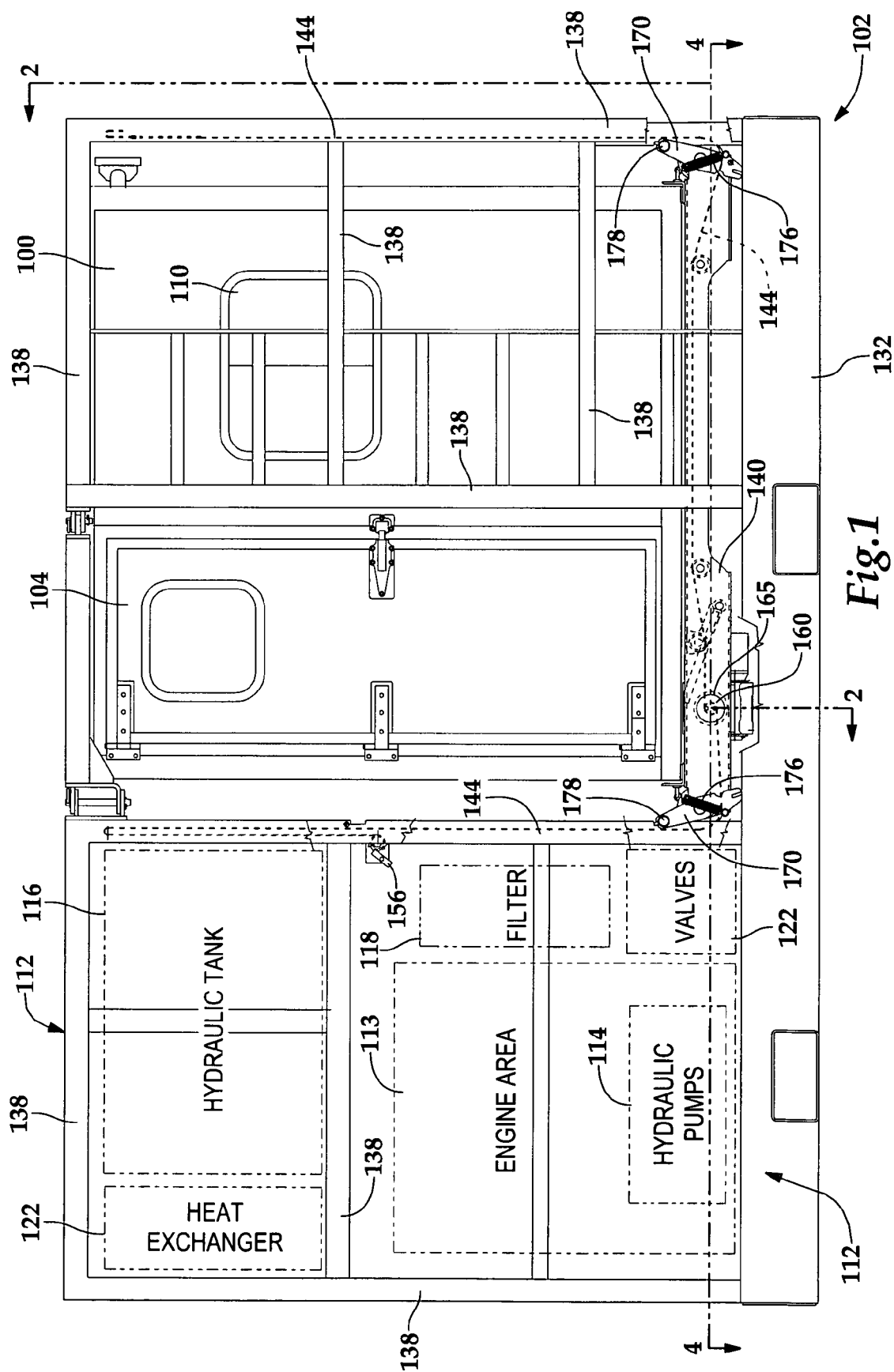
FIG. 1 is a side, elevational view of a skid-mounted control cabin with an integrated hydraulic power supply system, in a lowered position.
Figure 2:
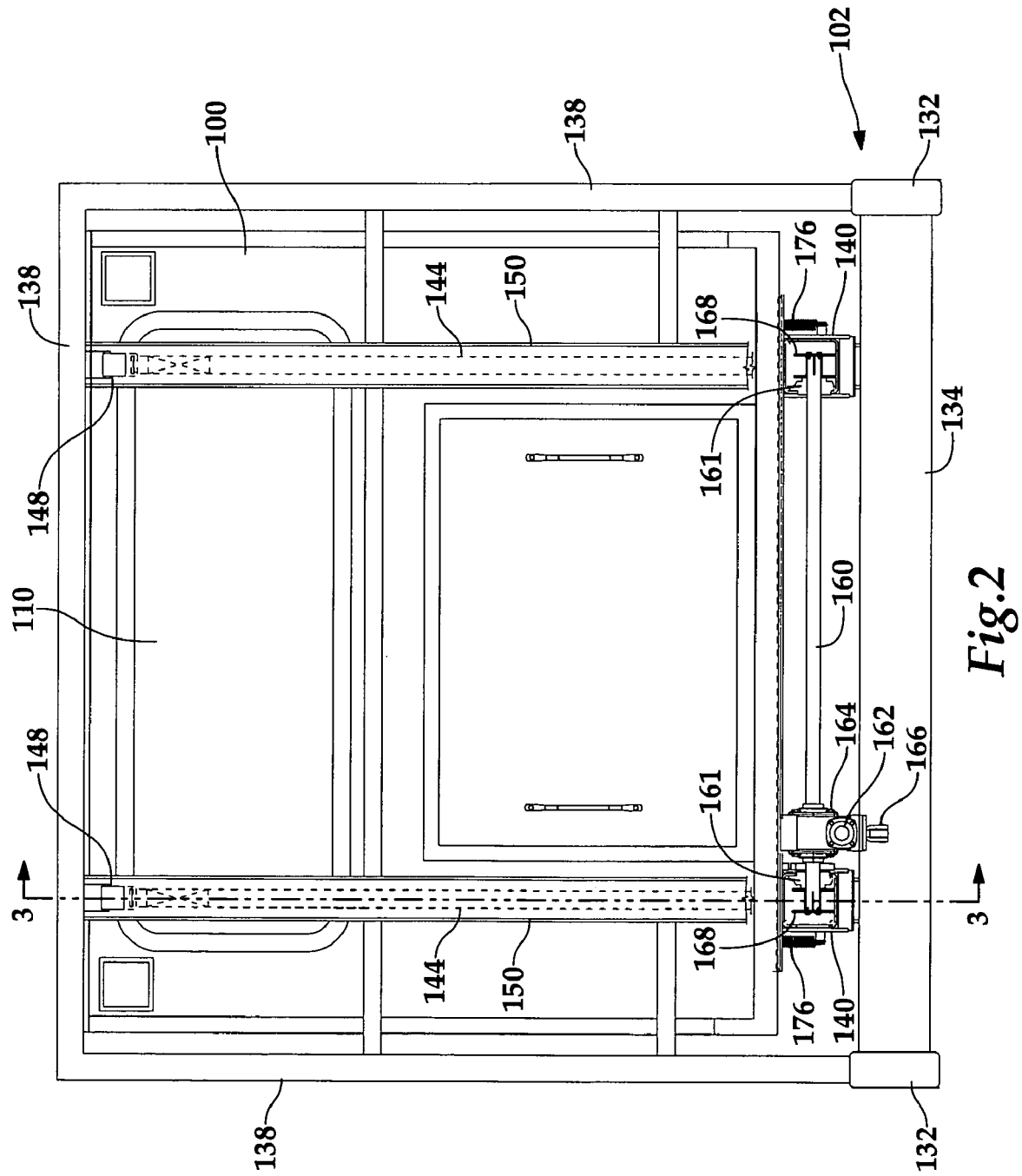
FIG. 2 is a cross-section of the skid-mounted control cabin taken along section line 2—2 in FIG. 1.
Figure 3:
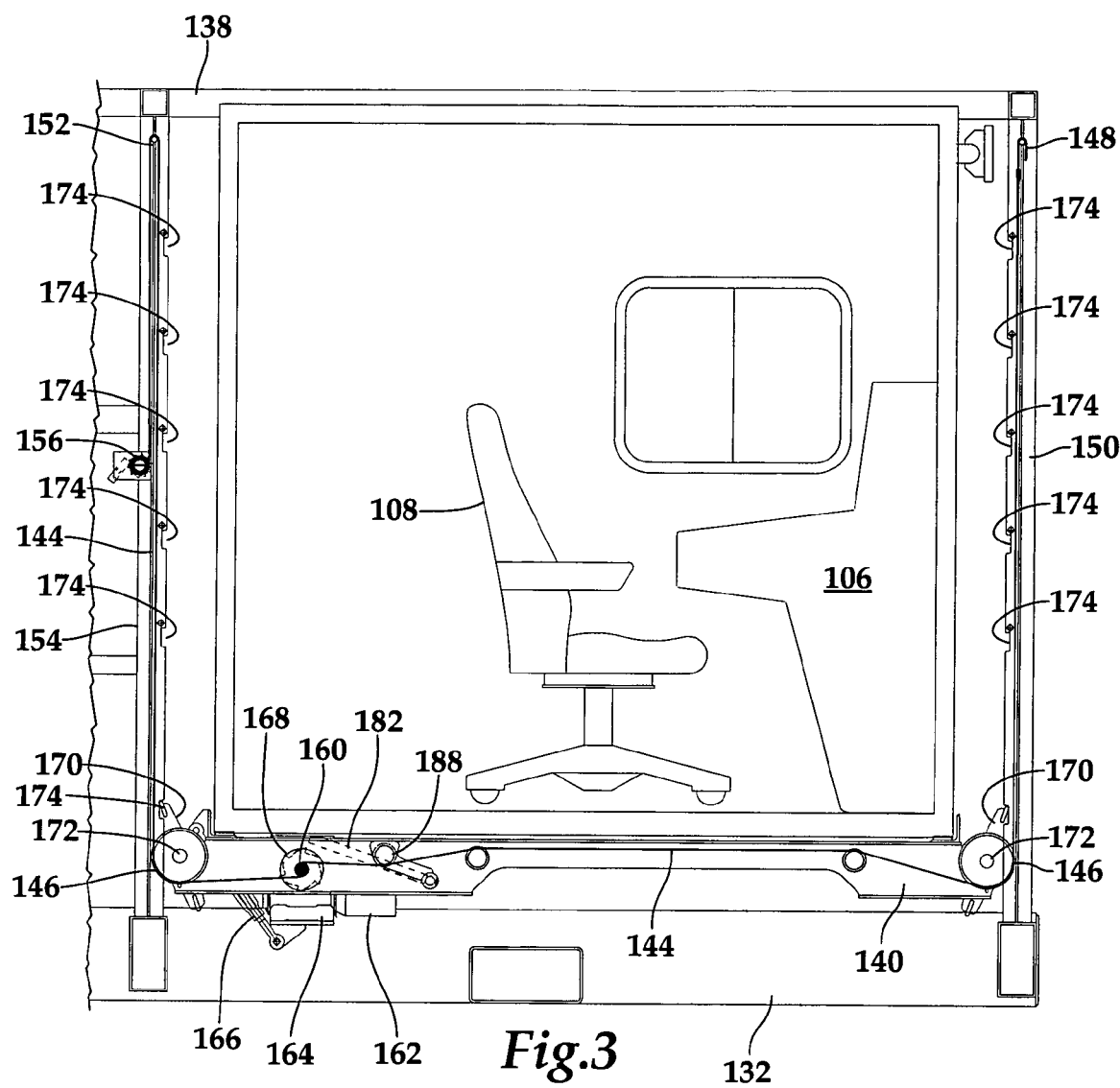
FIG. 3 is a cross-section of the skid-mounted control cabin taken along section line 3—3 in FIG. 2.

Like numbers refer to like elements in the following description.

Illustrated in FIGS. 1–10 is an example of a typical control cabin 100 for use by an operator of a coiled tubing injector and reel. It is only representative of such cabins. The cabin is, in the exemplary application that is illustrated, mounted to a skid. The skid is generally designated 102. The skid may be transported to the well site, whether it is on land or on a offshore platform, and placed at the site for use. It may also be mounted to a trailer or other vehicle that is taken to the site.

The cabin has a door 104 to enter the cabin. Inside the cabin is an operator's console 106 (see FIGS. 3 and 8) and chair 108. The cabin includes windows 110 for enabling the operator to view outside the cabin.

In the illustrated example, a power pack, generally designated as 112 is mounted on the skid. The power pack is conventional; its components and operation are well known. Dashed line boxes represent the components of the power pack. The components include an engine 113 that drives hydraulic pumps 114. Tank 116 stores hydraulic fluid. Filter 118 cleans the hydraulic fluid. Valves 120 control the flow of hydraulic fluid through hydraulic circuits that supply the hydraulic fluid to motors on a reel (not shown), coiled tubing injector (not shown) and other hydraulic motors, cylinders and devices that may be used on or in connection with the coiled tubing injector, reel and other machines brought to the well site. The power pack also includes a heat exchanger 122 for cooling the hydraulic fluid, fuel tank 124 for storing fuel for the engine, a radiator 126 and muffler 128 for the engine, and a lubrication storage tank 130. The operator in the control cabin operates the engine and valves to control operation of the injector, the reel and other machines. Operator's console 106 includes controls for enabling the operator to operate the valves and other components in the power pack.

Skid 102 includes two side members 132 joined by several cross members, each member referenced with the number 134. Additional members 136 are included below the area of the power pack to support components of the power pack. Several additional structural members, each designated 138, form a frame on top of the skid that surrounds the cabin and the power pack.

Cabin 100 is shown in a lowered position in FIGS. 1–4 and in a fully raised or elevated position in FIGS. 7–10. The distance between the fully lowered and fully raised positions in the illustrations is preferably approximately equal to the height of the cabin. A strap, chain, cable or other elongated flexible element having sufficient tensile strength lifts the cabin. It extends from a relatively high point on a frame or other member adjacent the cabin to a lower point on the cabin—for example from a point roughly equal to the height of the cabin to a point on or near the bottom of the cabin. A take-up mechanism shortens the length of the flexible element between two points. Shortening the length of the flexible element between the relatively high points on the adjacent frame and the cabin lifts the cabin. A flexible element allows for a more compact design than, for example, hydraulic cylinders and scissor lifts, and is more cost effective.

Use of a single length of flexible element, running between two relatively high points on opposite sides of the cabin, which points are adjacent to but not on the cabin, and then under the cabin or under a frame carrying the cabin reduces the number of take up mechanisms required. (Only the cabin will be referenced in the following explanation, with the understanding that a separate frame or table can be treated as part of the cabin for purposes of the following explanation.) Only one take up mechanism is required, although more than one could be used. To lift the cabin, a take-up mechanism reduces the length of the flexible element extending under the cabin between the two relatively high points on the adjacent frame, thereby causing the cabin to be raised. However, taking up the flexible element from only one side increases the chance that the cabin will tilt due to friction as the cabin rolls or shifts under the force of gravity on the flexible element to maintain a centered position. If vertical guides are positioned on either side of the cabin to prevent the cabin from shifting laterally during raising and lowering, the tilting could cause the cabin to become jammed between the guides.

Assuming at least two points of contact between the cabin and the flexible element on opposite sides of the center of gravity of the cabin, taking up both ends of the flexible element at the same rate creates opposing frictional forces that, in effect, cancel each other. Lateral forces on the cabin that could cause tilting and jamming are thus avoided. Although this could be done, for example, by two take-up mechanisms at each end of the flexible element, two take-up mechanisms impose additional cost and require a mechanism to synchronize their operation. It is therefore preferred to use a single take up mechanism located between the ends of the flexible element that can take up both ends of the flexible element at the same rate and at the same time. One way to implement this arrangement is by attaching each end of the flexible element to the cabin and running the flexible element over each of the relatively high points on the adjacent frame or stationary structure, and positioning the take up mechanism on the adjacent or stationary structure somewhere along the path of the strap between the two high points. However, a preferred arrangement is anchoring each end of the flexible element on the adjacent frame (i.e. something other than the cabin) and running the flexible element under the cabin. The take-up mechanism is then mounted on the cabin between the two ends of the flexible element. This preferred arrangement permits a shorter length of flexible element to be used and easily permits the flexible element to be protected.

The figures illustrate an example of a lifting mechanism for cabin 100. The mechanism includes a frame that will be referred to as a cradle, at least two vertical members, one on each side of the cabin, and a nylon strap that is suspended between two vertical members and runs under the cradle. The vertical members also serve as rails to guide the cabin as it is being raised, though separate vertical guides can also be used. The cradle is preferably comprised of two side members 140 connected by two cross members 142 on which the cabin 100 rests. Two straps 144 are preferably used, one extending through each side member. However, one strap or more than two straps could be used. Each side member of the cradle has mounted at each end a guide roller 146. The strap turns around the guide roller at each end of the side member, inside a guide groove 147 formed in each roller. The strap then extends along the inside of the side member, the side member acting as a shield for the strap. One end of each strap is attached to an anchor point 148 (e.g. a pin) on front guide member 150 by, for example, a hook. The other end of each strap is run over a pin 152 on rear guide member 154 and then back down to a small take-up device 156 that is used to take up the extra slack in the strap during its installation. Front and rear guides 150 and 154 are preferably I-shaped (or at least U-shaped) so that the strap can be protected within a channel formed by the member and so that guide rollers 146 can roll inside the channel formed by each member.

Each strap is run through a take-up device or mechanism in the form of a slotted shaft. Note that in some figures (e.g. FIG. 5) the straps are omitted to reveal additional details. Turning the shaft winds the strap onto the shaft from both directions. Because two straps are used, a single shaft 160 extending between side members 140 is preferred. The single shaft means only one motor and gearbox is required to drive the two take-up mechanisms and ensures synchronous operation. Multiple motors and shafts could be used instead without these advantages. Bearings 161 in each side member supports the shaft for rotation. A single hydraulic motor 162 connected to a right angle gearbox 164 rotates it. Turnbuckle 166 anchors the gearbox and prevents it from rotating around the shaft. Each end of the shaft has a slot 158, through which the strap is placed. A pair of spaced apart flanges 168 helps to ensure that the strap is wound correctly on the slotted shaft.

At each end of each side member 140 is a latch 170. Each latch pivots about axle 172 between one of two positions. In either position it cooperates with one of a plurality of notches 174 formed along the edge of the front and rear guides 150 and 154, respectively. Spring 176 is always in tension and is designed to apply a biasing force to the latch when it is rotated past a neutral point that forces it toward the closest position. A handle 178 is used to manually overcome the biasing force and flip the latch between positions. In the first position, shown in FIGS. 1–3, the latch cooperates with the lowest of notches 174 to hold down the cabin during transport. To raise or lift the cabin, the latch is flipped to the second position, shown in FIGS. 7 and 10. As the cabin is being lifted, the latches will click in and out of notches 174. When the desired height is reached, the cabin is lowered until the latches firmly engage notches at the desired height. This shifts the weight of the cabin to vertical guides 150 and 154. To lower the cabin, the cabin is slightly raised and the latch is flipped back to the first position, which allows the cabin to be lowered but not raised.

Figure 6:
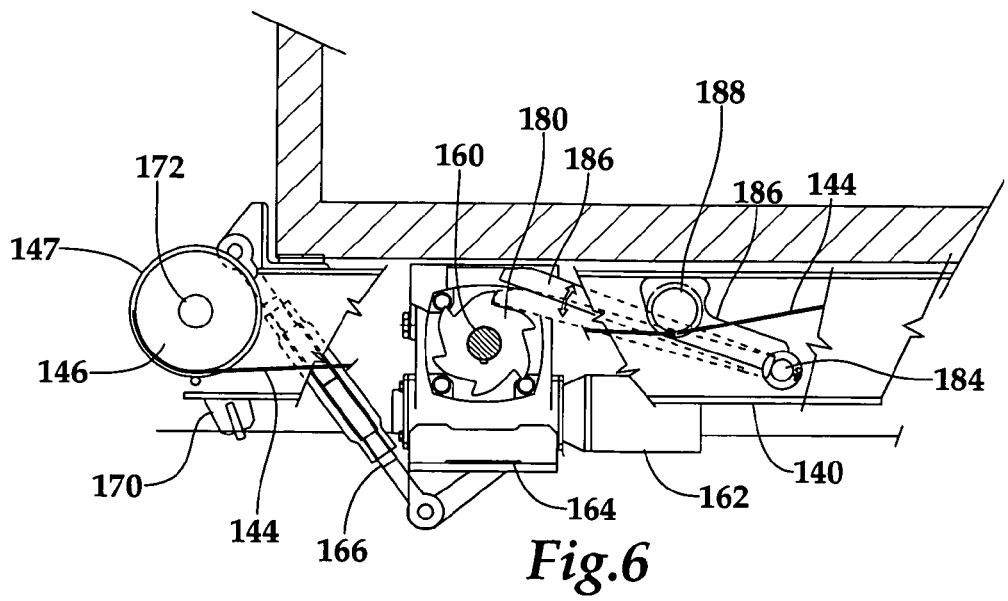
FIG. 6 is an enlargement of a portion of the cross-section of FIG. 3.
Figure 4:
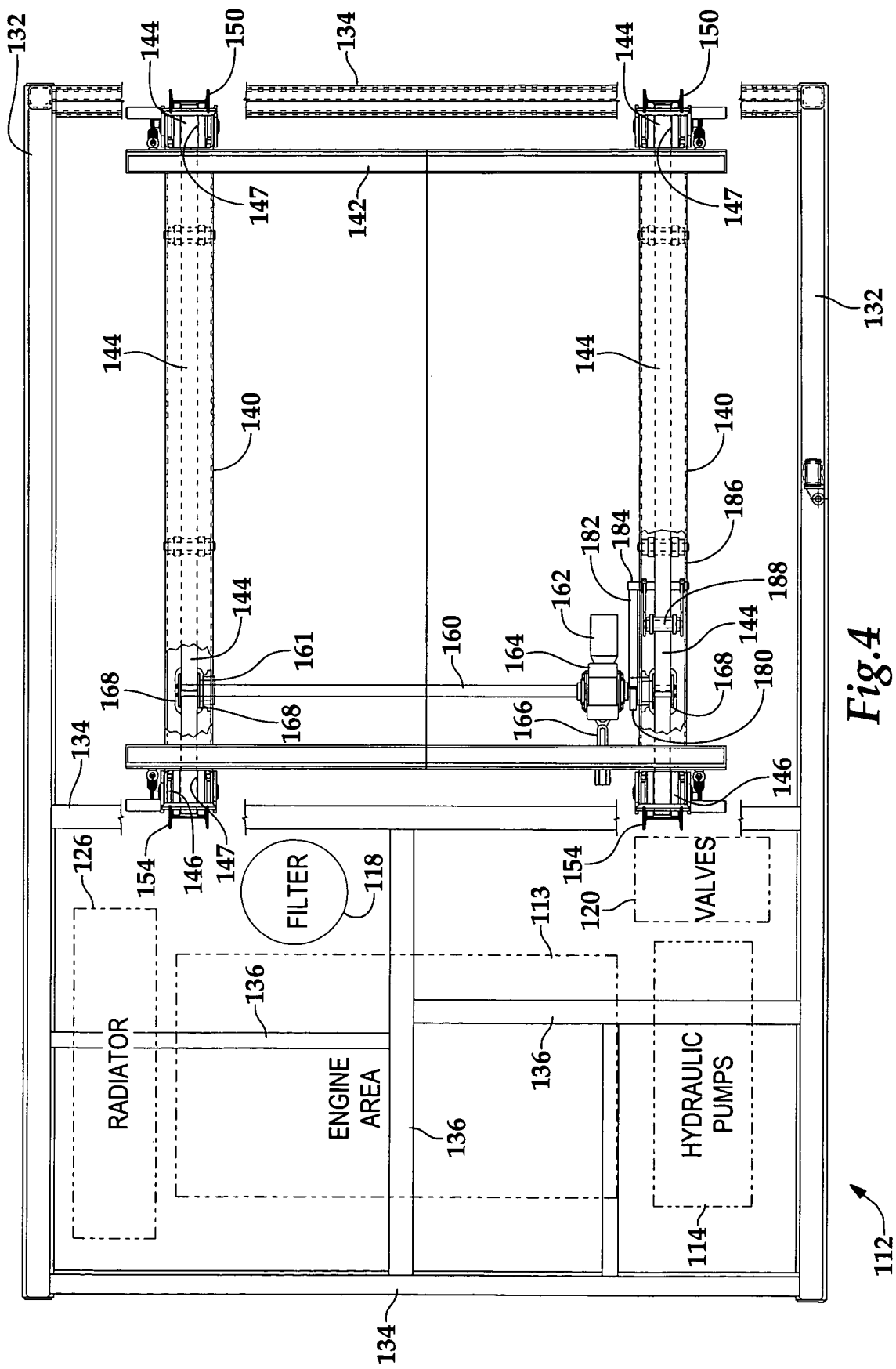
FIG. 4 is a cross-section of the skid-mounted control cabin taken along section line 4—4 in FIG. 1.
Figure 5:
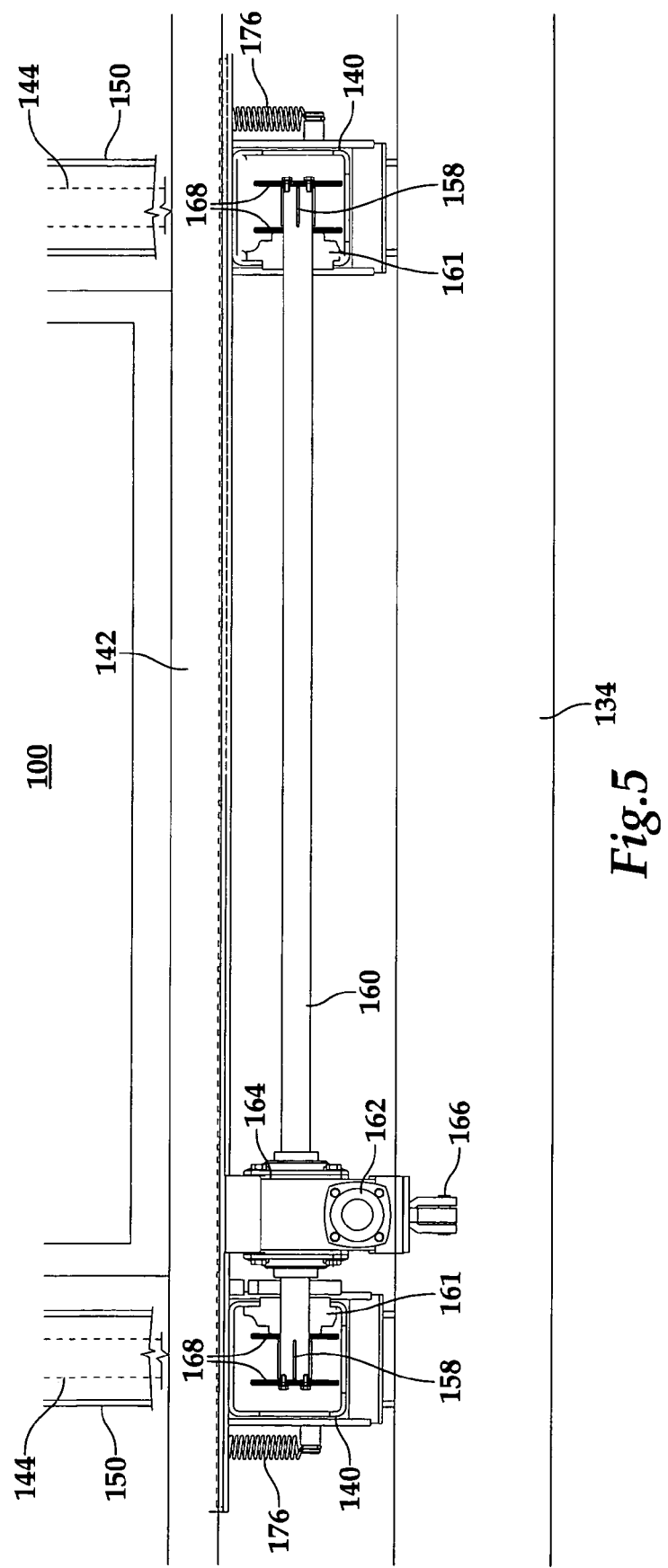
FIG. 5 is an enlargement of a portion of the cross-section of FIG. 2.
Figure 7:
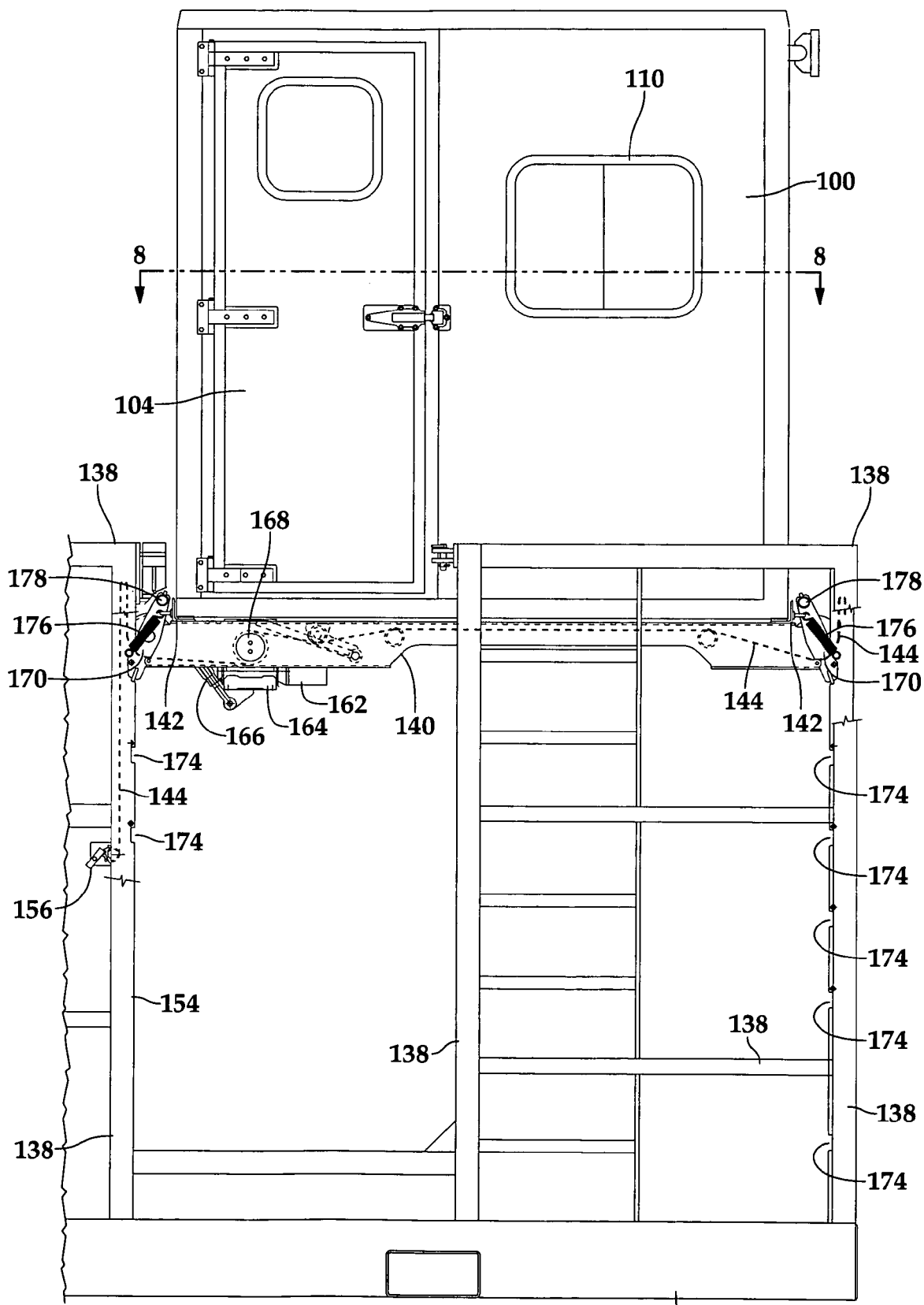
FIG. 7 is an elevational view of the skid-mounted control cabin in an elevated position.
Figure 8:
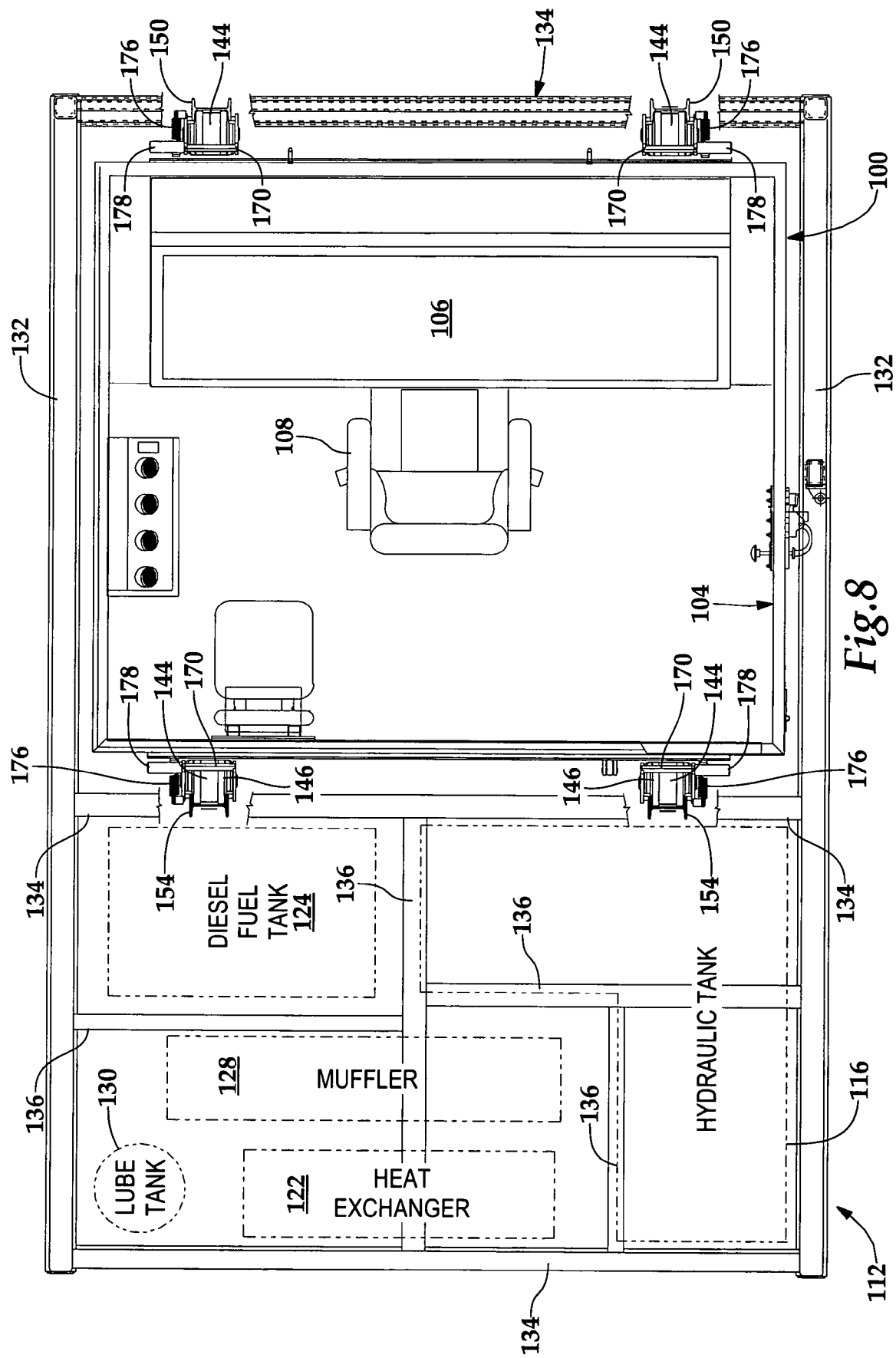
FIG. 8 is a cross-section of the skid-mounted control cabin, in an extended position, taken along section line 8—8 in FIG. 7.
Figure 9:
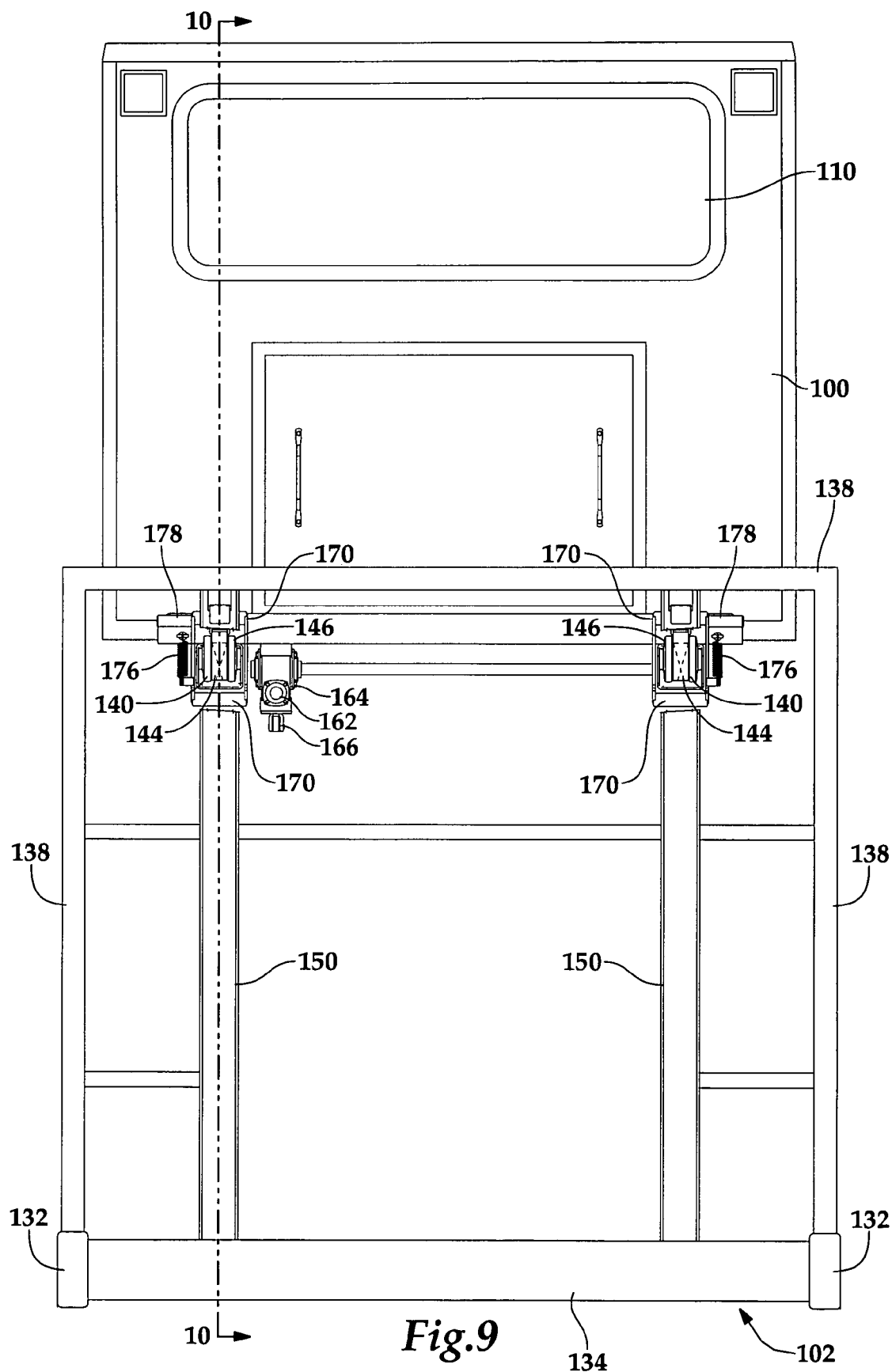
FIG. 9 is a front elevational view of the skid-mounted control cabin in an elevated position.
Figure 10:
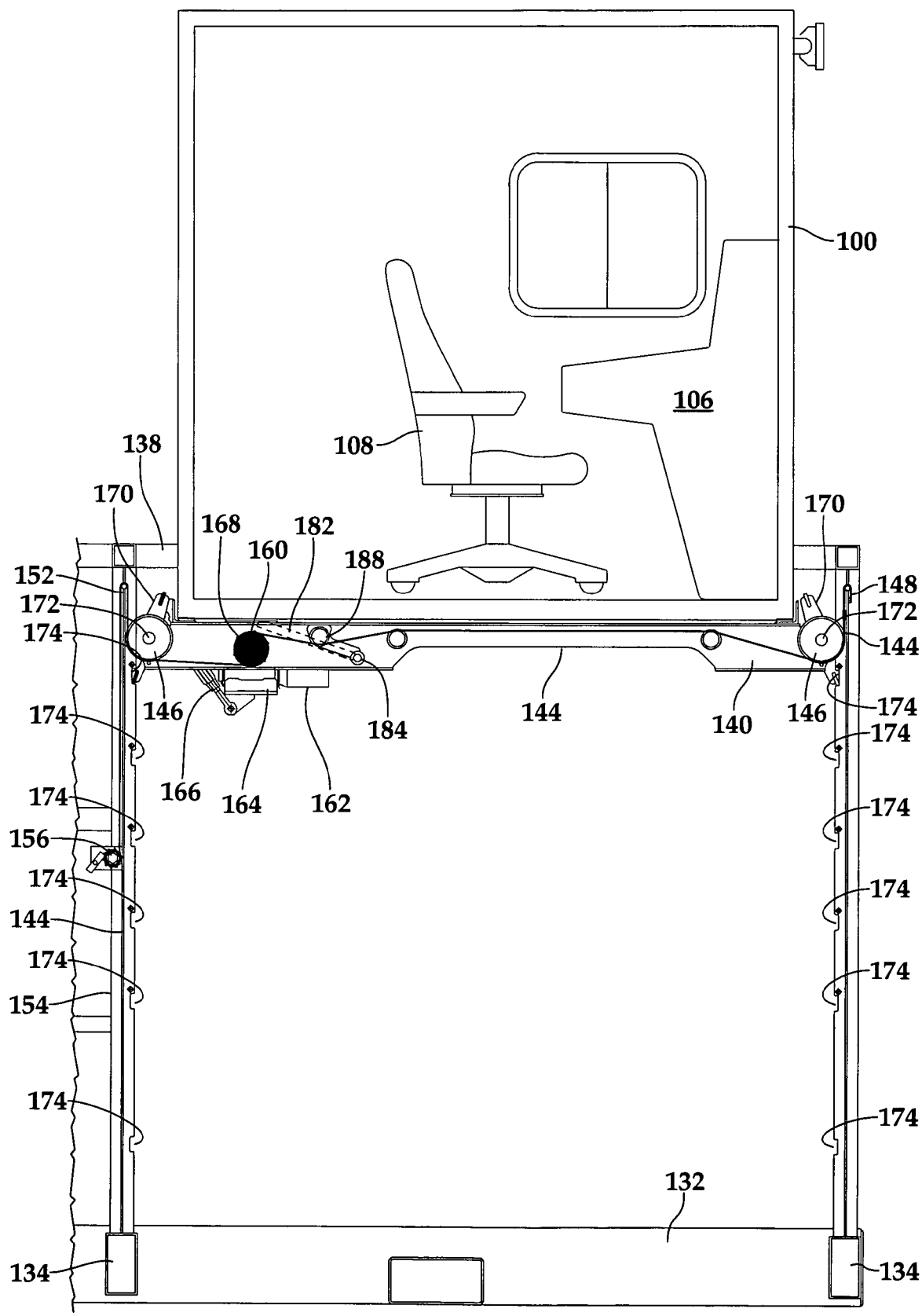
FIG. 10 is a side, cross-sectional view of the skid-mounted control cabin in an elevated position, taken along section line 10—10 in FIG. 9.

A tension-sensing ratcheting mechanism, best seen in FIGS. 4 and 6, locks the take-up mechanisms to prevent them from unwinding when the weight of the cabin is removed and there is relatively little tension on the straps. If the strap unwinds or becomes loose, it may become jammed or tangled, or the cabin may drop when released for lowering. Because a common torque shaft connects the two take-up mechanisms, a single ratcheting mechanism is all that is required in the illustrated embodiment. Ratchet 180 is coupled with shaft 160. Ratchet pawl 182 and lift arm 186 pivot on axle 184. Lift roller 188 is connected to lift arm 186 so that, when tension is applied to strap 144, it raises the lift arm. Raising the lift arm causes ratchet pawl 182 to lift up and away from the teeth of the ratchet, thereby permitting the ratchet and take up mechanism to turn freely so that the strap can be unwound.

Figure 11:
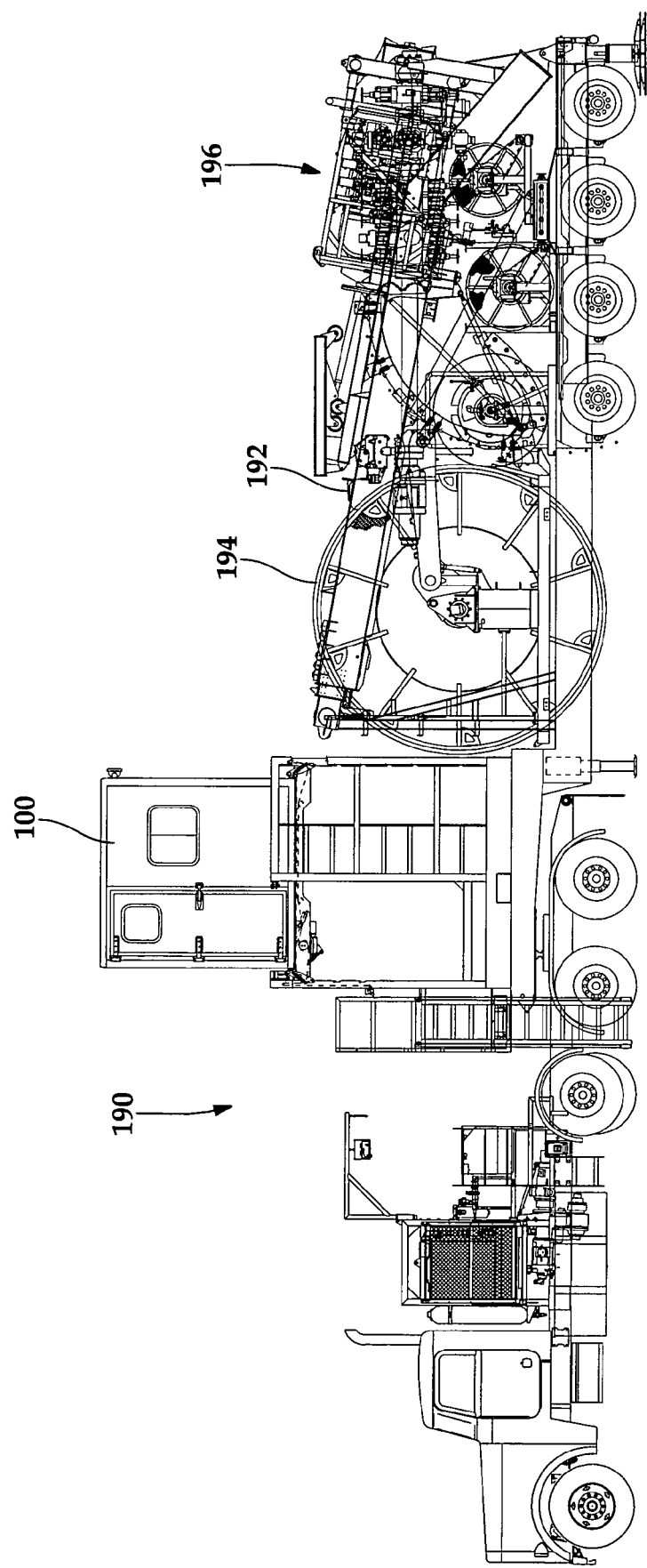
FIG. 11 is an example of the control cabin of FIGS. 1–10 mounted on a self-contained trailer having a reel, mast, blowout preventer and coiled tubing injector.

Referring now only to FIG. 11, cabin 100 and the lifting mechanism described above, may also be mounted on a vehicle, such as, for example, self-contained tractor and trailer 190. Such a vehicle may be used to carry most if not all of the major components required to perform a work over operation at a well site on land—namely a crane 192 (shown in a flat position for stowage and transportation), a reel (or a stand for a reel) of coiled tubing 194, and a coiled tubing injector 196. The injector must, along with a blowout preventer, be placed on top of a wellhead. With the crane mounted on the rear of the truck, the truck backs up to the wellhead. The crane lifts the injector and blowout preventer off of the truck and suspends them over the wellhead during the work over operations. The coiled tubing is on a reel placed on the truck in a position that enables it to be unwound and directly fed into the top of the coiled tubing injector, and then wound back onto the reel as it is being pulled from the well. Cabin 100 is shown in an elevated position, behind the reel of coiled tubing but high enough to clearly see over it.

What is claimed is:

1. A transportable, elevating operator cabin for use in connection with controlling heavy machinery at a remote site, comprising:
   a cabin including control elements for machinery, in which an operator may sit while controlling the machinery;
   an elongated flexible element extending under the cabin, between two, elevated points on adjacent structures located on opposite sides of the cabin;
   and a take-up mechanism for changing the length of the flexible element between the two, elevated points, the take-up mechanism mounted between the two, elevated points in a fixed position relative to the cabin during elevation of the cabin, whereby operation of the take-up mechanism results in a change in elevation of the cabin with respect to the adjacent structures.

2. The transportable, elevating operating cabin of claim 1, further comprising a frame for guiding the cabin during elevation.

3. The transportable, elevating operator cabin of claim 2, wherein the frame is comprised of a plurality of vertical guides.

4. The transportable, elevating operator cabin of claim 3, wherein the plurality of vertical guides include the structures for holding the flexible element at the two, elevated points.

5. The transportable, elevating operator cabin of claim 1, further comprising a frame and a locking mechanism for locking the position of operator cabin once in an elevated position.

6. The transportable, elevating operator cabin of claim 1, further comprising a second flexible element extending a fixed length under the cabin and held near its opposites ends between two, elevated points on opposite sides of the cabin.

7. The transportable, elevating operator cabin of claim 6, wherein the operation of the take-up mechanism simultaneously changes the lengths of both flexible elements in a synchronous manner.

8. The transportable, elevating operator cabin of claim 6, wherein the take-up mechanism is comprised of a rotating shaft extending across the bottom of the cabin, on which the two flexible elements are simultaneously wound.

9. The transportable, elevating operator cabin of claim 1, further including a ratchet and pawl arrangement coupled with the take-up mechanism for preventing unintended unwinding of the take-up mechanism.

10. A coiled tubing injection apparatus, comprising:
    a reel of coiled tubing; a coiled tubing injector; an operator cabin assembly, including an operator cabin including control elements for machinery, in which an operator may sit while controlling the machinery;
    a flexible element extending under the cabin between two, elevated points on structures located on opposite sides of the cabin;
    and a take-up mechanism for changing the length of the flexible element, the take-up mechanism mounted between the two, elevated points in a fixed position relative to the cabin during elevation of the cabin, whereby operation of the take-up mechanism results in elevating the cabin with respect to the structures.

11. The coiled tubing injection apparatus of claim 10, further comprising a frame for guiding the cabin during elevation, wherein the frame is comprised of a plurality of vertical guides.

12. The coiled tubing injection apparatus of claim 11, wherein the plurality of vertical guides include the structures for holding the flexible element at the two, elevated points.

13. The coiled tubing injection apparatus of claim 10, further comprising a locking mechanism for locking the position of the operator cabin once in an elevated position.

14. The coiled tubing injector apparatus of claim 10, further comprising a second flexible element extending a fixed length under the cabin and held between two, elevated points on structures located on opposite sides of the cabin.

15. The coiled tubing injector apparatus of claim 14, wherein the operation of the take-up mechanism simultaneously changes the lengths of both flexible elements in a synchronous manner.

16. The coiled tubing injector apparatus of claim 14, wherein the take-up mechanism is comprised of a rotating shaft extending mounted underneath the cabin, on which the two flexible elements are simultaneously wound.

17. The coiled tubing injector apparatus of claim 10, further including a ratchet and pawl arrangement coupled with the take-up mechanism for preventing unintended unwinding of the take-up mechanism.

18. The coiled tubing injection apparatus of claim 10, wherein the cabin is mounted on a skid for transport.

19. The coiled tubing injection apparatus of claim 10, wherein the operator cabin assembly, coiled tubing reel and a crane are mounted on a vehicle for transport.

20. A transportable, elevating operator cabin for use in connection with controlling heavy machinery at a remote site, comprising:
- a cabin including control elements for machinery, in which an operator may sit while controlling the machinery;
- a frame including vertical guides disposed on opposite sides of the cabin;
- a plurality of elongated, flexible elements extending under the cabin, and held on opposite sides of the cabin at elevated positions on the vertical guides;
- a take-up mechanism for synchronously changing the length of each of the plurality of flexible elements, the take-up mechanism mounted in a fixed position relative to the cabin, between opposing vertical guides, whereby operation of the take-up mechanism results in a change of elevation of the cabin with respect to the vertical guides.

21. The transportable, elevating operator cabin of claim 20, wherein the take-up mechanism is comprised of a rotating shaft mounted underneath the cabin, on which the plurality of flexible elements are simultaneously wound.

22. The transportable, elevating operator cabin of claim 20, further including a ratchet and pawl arrangement coupled with the take-up mechanism for preventing unintended unwinding of the take-up mechanism.

23. The transportable, elevating operator cabin of claim 20, further comprising a locking mechanism for locking the position of the operator cabin to the frame when the cabin is in an elevated position.

24. The transportable, elevating operating cabin of claim 20, wherein the operator cabin is mounted on a vehicle forward of a coiled tubing reel, coiled tubing injector and crane, the cabin housing control elements for operation of the reel and coiled tubing injector.

\* \* \* \* \*